March 16, 1948.   J. U. RICHARD   2,437,788
SANDING DEVICE FOR MOTOR VEHICLES
Filed Nov. 21, 1946
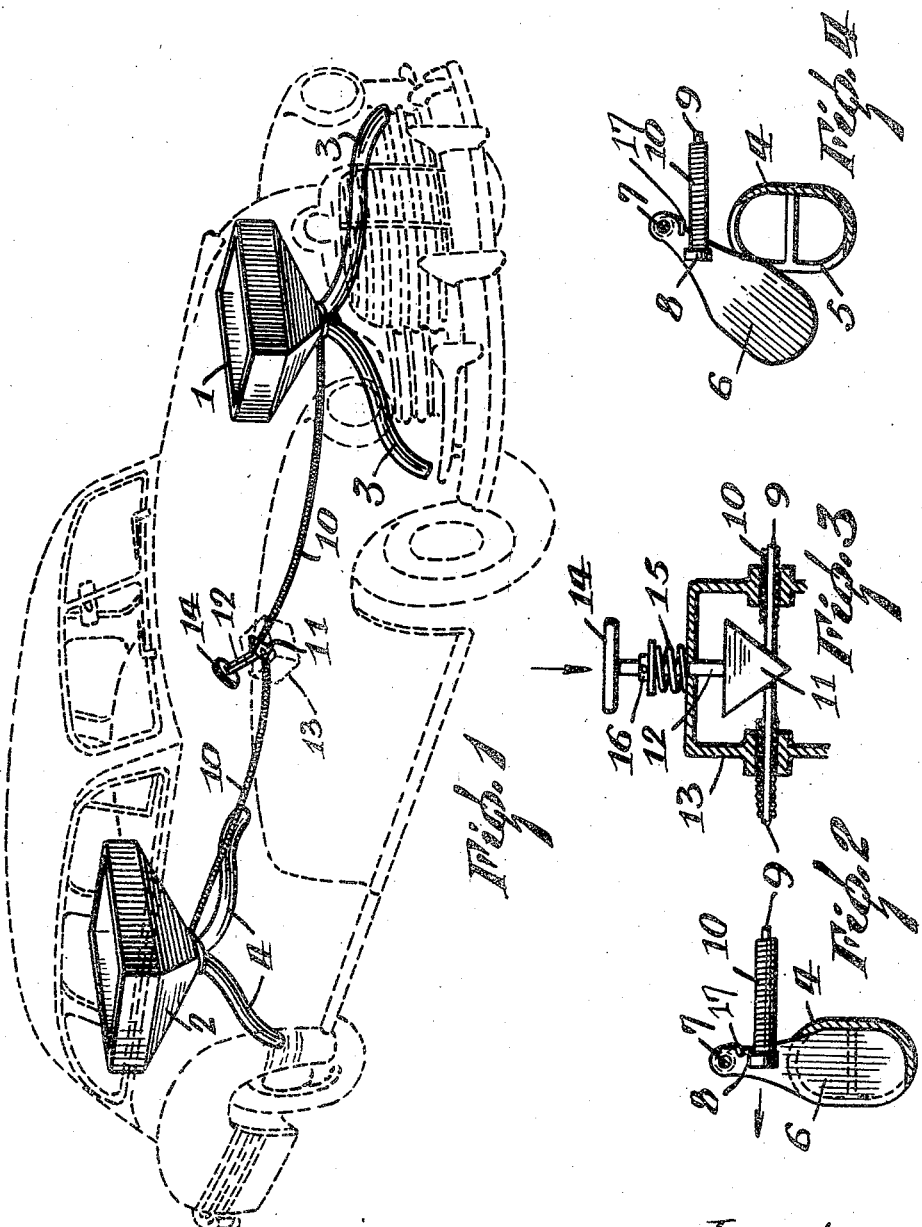
Inventor
Joseph Ulric Richard
By
Attorney Patented Mar. 16, 1948

2,437,788

UNITED STATES PATENT OFFICE 2,437,788

SANDING DEVICE FOR MOTOR VEHICLES

Joseph Ulric Richard, Montreal, Quebec, Canada

Application November 21, 1946, Serial No. 711,332
In Canada February 13, 1946

1 Claim. (Cl. 291—35)

The present invention pertains to a novel sanding device for motor vehicles and designed to discharge sand, cinders, gravel, salt and the like in front of the wheels of the vehicle when the ground is slippery.

The principal object of the invention is to provide a simple device to be carried by the vehicle for spreading an abrasive on slippery areas covered with ice, hardened snow, oil and the like. Another object of the invention is to provide a device of this character that is easily operated by means of a pedal disposed near the foot of the driver.

Still another object of the invention is to provide a device of the character described that is simple in construction and economical to operate and install.

In the accomplishment of these objects a pair of hoppers are mounted on the vehicle, preferably at the front and rear, and fitted with tubes that extend respectively in front of the forward and rear wheels. The tubes merge at the bottom of each hopper and are there fitted with a hinged plate valve that slides through the wall of the merged tubes. Operating flexible thrust members extend from the valves to a point below the floor boards at the driver's feet, and a wedge is inserted between the free ends of the flexible thrust members. A stem extends upwardly from the wedge into the driver's compartment and is there fitted with a pedal within easy reach of the driver. When the driver depresses the pedal, the wedge pushes on the flexible thrust members and causes the valves to open, thereby establishing flow from the hoppers to the respective tubes. When the foot is released from the pedal, the wedge returns to a position that permits the valves to close.

The invention is fully disclosed by way of example in the following description and in the accompanying drawings in which:

Figure 1 is a perspective view of an automobile in phantom, with the device of the invention applied thereto;

Figure 2 is a plan view of one of the valves;

Figure 3 is a sectional view of the valve operating mechanism; and

Figure 4 is a detail similar to Figure 2, showing the valve in open position.

Reference to these views will now be made by use of like characters which are employed to designate corresponding parts throughout.

As already indicated, the invention comprises two hoppers 1 and 2 or receptacles in the form of inverted pyramids. The receptacle 1 is mounted beneath the hood of the vehicle, between the radiator and the motor, and the receptacle 2 at a suitable rear position, such as in the luggage compartment. Obviously, the receptacles need not be located in this specific manner so long as they are positioned respectively near the front and rear of the vehicles.

A pair of tubes 3 diverge from the bottom of the hopper 1, and a similar pair of tubes 4 diverge from the bottom of the hopper 2, terminating respectively in front of the forward and rear wheels and at a short distance from the ground.

Where the tubes join the respective hoppers, they are contiguous to each other or merged into one another, as may be seen in Figures 2 and 4. The union of the tubes 4 is indicated in these figures, and it will be understood that the union of the tubes 3 is identical therewith. At the union the merged tubes are formed with a continuous slot 5 that receives a plate valve 6. Each valve 6 is pivotally mounted on a suitably positioned hinged pin 7 and is provided with a lug 8 pivotally mounted thereon between the pin 7 and the corresponding tubes. A flexible thrust member 9 extends from each lug and is enclosed in a coiled wire armor or sheath 10. The free ends of the flexible thrust members engage opposite sides of a triangular wedge 11 from which extends a stem 12 slidably mounted in a housing 13 that slidably supports the free ends of the shafts and their armors. A pedal 14 is mounted on the upper end of the stem 12, and a coil spring 15 surrounding the stem and bearing upon the housing 13 exerts an upward pressure on a collar 16 fixed on the stem. In the elevated position of the wedge, as shown in Figure 3, the valves are closed, and a downward pressure on the pedal 14 opens the valves.

The pedal 14 is disposed near the operating pedals of the motor vehicle and is within easy reach of the foot of the driver. When it is desired to discharge sand in front of the wheels, the pedal is depressed to open the valves 6 to the position shown in Figure 4, whereupon sand from the hoppers flows freely to the ground in front of the wheels. To return valves 6 to previous position, springs 17 are coiled on pins 7 and one end fixed thereto and the other ends of said springs are fixed to and pull valves 6 to a closed position.

In the use of the device the rear hopper 2 may be used alone when the rear wheels are the driving wheels, or an individual hopper could be provided for each rear wheel. In such case the hopper or hoppers would be individually controlled. Other than sand, the hoppers may contain cinders, ground slag, gravel, salt and the like.

Although a specific embodiment of the invention has been illustrated and described, it will be understood that various alterations in the details of construction may be made without departing from the scope of the invention as indicated by the appended claim.

What I claim as my invention is:

In combination with a motor vehicle, a pair of hoppers mounted thereon, tubes leading from said hoppers to points in front of the forward and rear wheels of said vehicle, said tubes merging at said hoppers, a valve slidable through the merged tubes at each hopper, flexible thrust members extending from lugs pivotally mounted on said valves and having their free ends in proximity to each other, a triangular wedge block movable between said free ends engaged thereby, and a pedal on said wedge, and means to return said slidable valves to normally closed position.

JOSEPH ULRIC RICHARD.

REFERENCES CITED

The following references are of record in the file of this patent:

UNITED STATES PATENTS

| Number | Name | Date |
|---|---|---|
| 1,833,084 | Liedberg | Nov. 24, 1931 |
| 1,842,506 | Brueggeman | Jan. 26, 1932 |
| 2,109,114 | Kerr, Jr. | Feb. 22, 1938 |
| 2,244,069 | Kook et al. | June 3, 1941 |